Aug. 22, 1967   F. E. BROWN   3,337,096
PUMP-TYPE DISPENSER
Filed March 21, 1966
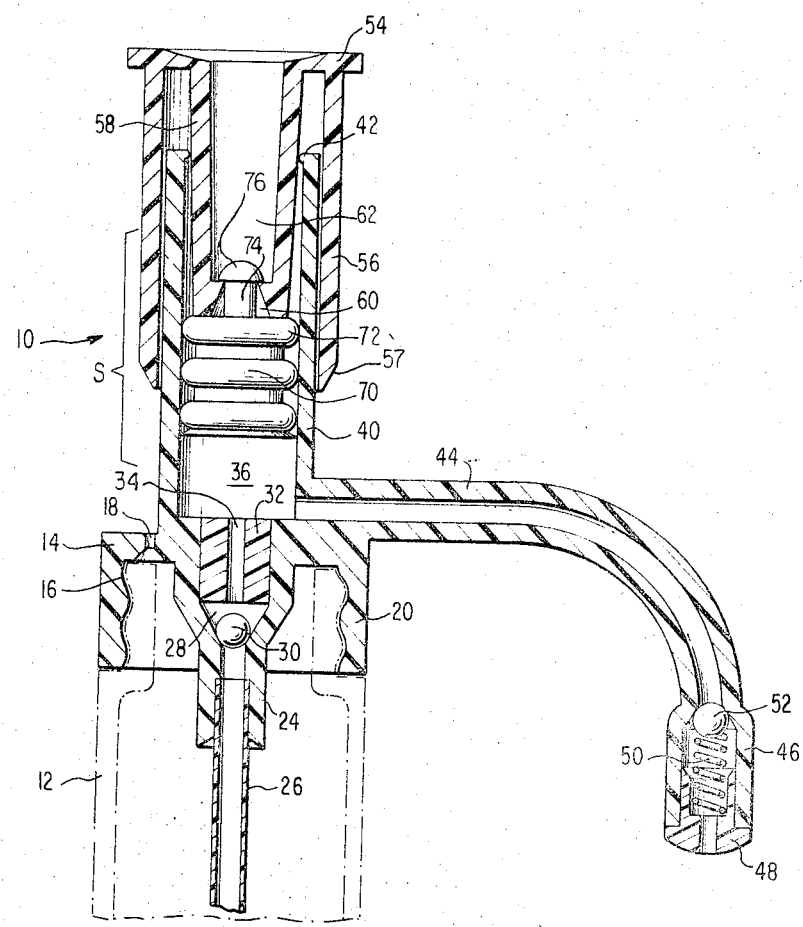
INVENTOR
FRANK E. BROWN
BY Stowell & Stowell
ATTORNEYS

United States Patent Office 3,337,096
Patented Aug. 22, 1967

3,337,096
PUMP-TYPE DISPENSER
Frank E. Brown, Glendale, Calif., assignor to White Laboratories, Inc., Kenilworth, N.J., a corporation of New Jersey
Filed Mar. 21, 1966, Ser. No. 535,953
5 Claims. (Cl. 222—380)

This invention relates to metered dispensing devices and more particularly to a device for dispensing precise amounts or volumes of a liquid formulation such as a medicament from a supply or storage container in which the medicament is placed prior to its usage for therapeutic or medical purposes.

With the advent of an increasing number of liquid medicaments or formulations available for the use of both physicians in their offices and by patients who self-administer these formulations, it becomes increasingly necessary to provide a storage container for the liquid formulations in combination with a metering device for these storage containers which will allow even the most inexpert individual to obtain a desired quantity or volume of the formulation from the supply container. Further, it is desirable that such a dispensing device should be both inexpensive and relatively fool-proof as well as exhibiting precision in dispensing a desired quantity of the formulation.

The present invention fulfills these requirements and according to its practice a dispensing device may be fabricated whose main components are plastic, yet by virtue of its particular construction, will readily withstand rather rough and careless treatment by the various users. This enables the fabrication of such a metered dispensing device to be made from a relatively inexpensive material such as plastic.

The device of the present invention has substantial utility as a metering dispenser means for medicaments such as antacids, antibacterials, antibiotics, antidiarrheals, antihistamines, antiseptics, mouth wishes, cough and cold preparations, hematinics, tonics, tranquilizers and vitamins, and for example, certain liquid cosmetic products such as shampoos, bath oils, dandruff preparations and the like.

According to one aspect of the present invention, a plunger type metered dispensing device is provided with means to prevent accidental withdrawal of the piston element from the metering device by virtue of the cooperation between the specific plunger actuator and the wall of a chamber.

Referring now to the drawing, the numeral 10 denotes generally the metered dispensing device of this invention, synonymously a variable dose dispenser, with the dispenser 10 being adapted to fit onto a container 12 having an upper externally threaded portion. A basal member 14 is provided with complementary internal threads 16 on the inner surface of a depending flange 20, with the threads 16 adapted to interengage the threads at the top of the container 12. It will be understood that the container 12 contains a liquid formulation or medicament and after the medicament is placed into the container 12, the latter may be sealed by an inexpensive screw threaded cap or the dispensing element 10 of this invention may be directly placed thereupon.

Numeral 18 denotes a vent hole extending through a portion of the basal member 14 and establishes fluid communication between the interior of container 12 and atmosphere.

The basal member 14 carries at its central internal portion a depending annular element 24 having a recess in its bottom portion adapted to receive a tube 26. The tube 26 is adapted to extend very nearly to the bottom of container 12. A medium density polyethylene has been found satisfactory as a material for tube 26. An intermediate portion of depending element 24 contains a cavity 28 which is tapered and a stainless steel ball or sphere 30 is positioned within the cavity 28. In the illustrated position, the ball 30 rests against the bottom tapering portion of chamber 28 to preclude fluid communication between the interior of tube 26 and the upper portion of chamber 28. The numeral 32 denotes a ferrule of generally annular construction and preferably formed of a plastic available on the open market under the trade name Marlex 5003, a high density polyethylene marketed by Phillips. This is a rather hard material. The ferrule 32 is provided with the central through aperture 34 which is in fluid communication with chamber 36.

The numeral 40 denotes a generally annular wall whose top rim is provided with a continuous radially inwardly extending abutment in the form of a lip 42. The numeral 44 denotes a curved nozzle in fluid communication at one end thereof with chamber 36 and having at its other end a one way valve defined by a flange portion 46 into which is placed another ferrule 48. One end of a stainless steel spring 50, under compression, abuts the ferrule 48 while its other end abuts a stainless steel ball or sphere 52. It will be apparent that stainless steel balls 30 and 52, in their illustrated seated positions, each define a one-way valve, more commonly known as a check valve. In practice, the annular wall 40, the nozzle 44 and ferrule 48 have been successfully fabricated using as a material of construction the earlier mentioned high density polyethylene known as Marlex.

The numeral 54 denotes a generally disc-like element having a depending annular wall 56 whose external lower portion is circumferentially chamfered as denoted by the numeral 57. The resultant lower portion of wall 56, being a portion of the plunger actuating mechanism, cooperates with suitable indicia on the external surface of wall 40 for the purpose of measuring accurate amounts of a liquid formulation. The indicia are denoted by the letter S.

The numeral 58 denotes another generally annular and elongated wall whose upper end is integrally attached to disc-like element 54, and whose lower end carries an aperture of a generally tapered form denoted by the numeral 60. In the embodiment of the invention illustrated, an aperture or hollow space 62 is defined by wall 58. The numeral 70 denotes a plunger or piston having a plurality of spaced wall engaging annular bead portions 72 and is provided at its upper portion with an integral neck 74, the latter terminating in a generally rounded or semi-spherical portion 76. It will be observed that semi-spherical portion 76 is of a slightly greater diameter than neck portion 74 and is slightly longer thereacross than the smallest portion of aperture 60. This particular joint may be formed by pushing the sleeve number 58 over the half ball 76 so that the lower portion of the sleeve 58 spreads somewhat in going over the ball 76 and then snaps radially inwardly to lock or firmly secure the joint between the plunger 70 and sleeve 58. In practice, the plunger 70 has been successfully fabricated with the plastic marketed by Dow Chemical Company under the trade name Zetafin, which is a modified polyethylene. Further, as a successfully employed material of construction, the plunger actuator comprising elements 54, 56 and 58, have been formed of a regular grade of transparent styrene.

The variable dose dispenser above described operates in the following manner. With the dispenser 10 mounted on the container 12, which holds a supply of a liquid formulation, the top 54 of the plunger actuating mechanism is lifted until a supply of the liquid is drawn up to chamber 36, with the ball 30 rising from its seat to allow passage of the fluid. The plunger is then depressed until it is observed that the liquid commences to flow through the end of nozzle 44. Here, it will be apparent that the check valve carrying the ball 30 will operate only to allow flow of liquid up from tube 26 into chamber 36 and the ball 52 will permit only the outward flow of any liquid in nozzle 44. At this point, i.e., after liquid has been observed flowing from the trip nozzle 44, the dispenser is ready to operate to exude metered amounts of the formulation. The user observes the position of the lower part of external sleeve 56 relative to the indicia S of the external part of wall portion 40. The plunger is then depressed until a desired different indicia marking is observed as being aligned with the lower edge of wall 56, or the plunger is depressed to the 0 barrel marking or until the plunger 70 has bottomed. The device is now ready for the next dispensing operation and it will be observed that after the initial filling of chamber 36 with enough fluid to cause an initial exudation through the end of nozzle 44, the device is at all times ready for dispensing operation.

An important feature of the invention will now be described. Assume that through perhaps carelessness on the part of a user, the plunger is withdrawn to such an extent that ordinarily the whole actuating mechanism and plunger would be separated from upstanding wall portion 40. With extreme upward motion of the plunger actuating mechanism, the top annular bead portion 72 of plunger 70 abuts the radially inwardly extending lip 42 of wall portion 40. After initial contact, further upward motion will cause a radially outward movement of the top rim of wall portion 40. But this movement is arrested after a very small length of travel by the upper portion of cylindrical wall 40 coming in contact with the interior of wall portion 56. This results in a wedging action, wherein the upper annular bead portion 72 of plunger 70 cooperates with a wall 56 to preclude, under normal operating conditions, complete withdrawal of the plunger from the wall portion, even though the plunger 70 is of sufficient flexibility to provide a seal with the cooperating wall portion 40 and to permit insertion of the plunger and plunger actuator sub-assembly into the barrel portion of the dispenser during assembly of the device.

What is claimed is:
1. A variable dose dispenser for liquid formulations including:
   (a) a generally annular basal member adapted to fit onto the top of a supply container for a liquid medicament,
   (b) said basal member carrying a one-way inlet valve positioned in a first flow passageway, with said first flow passageway carried by said basal member,
   (c) a metered medicament intake and dispensing chamber of generally annular cross-section carried by said basal member, said chamber defined by an elongated wall,
   (d) one end of said chamber being in fluid communication with said intake valve,
   (e) a reciprocating piston within said chamber, the periphery of said piston slidably engaging the inner wall of said chamber,
   (f) an elongated and annular sleeve slidably mounted on the exterior of said chamber with the inner wall of said sleeve contacting the outer wall of said chamber,
   (g) one end of said sleeve extending, in all positions of said sleeve relative to said chamber, beyond the end of said chamber remote from said inlet valve,
   (h) means for attaching said piston to said sleeve,
   (i) and an abutment carried by said chamber, said abutment extending radially inwardly of the inner wall of said chamber, whereby complete withdrawal of said piston from said chamber is precluded by said abutment.
2. The variable dose dispenser of claim 1 including:
   (a) a second flow passageway,
   (b) said second flow passageway having one end communicating with said chamber,
   (c) said second flow passageway having a one-way outlet valve positioned therein.
3. The variable dose dispenser of claim 2 wherein said outlet valve is positioned at the other end of said second flow passageway.
4. The variable dose dispenser of claim 1 wherein said means recited at (h) includes an elongated and annular member secured at one end to said piston and secured at its other end to a radially inwardly extending annulus at that end of said sleeve remote from said inlet valve.
5. The variable dose dispenser of claim 4 wherein:
   (a) said elongated and annular member has an aperture which receives a portion of said piston, said elongated and annular member having a cross-sectional area less than the maximum cross-sectional area of said piston.

References Cited

UNITED STATES PATENTS

| | | | |
|---|---|---|---|
| 2,096,461 | 10/1937 | Mane et al. | 222—382 X |
| 2,166,645 | 7/1939 | Shoemaker | 222—382 |
| 2,183,370 | 12/1939 | Selitzky | 222—380 |
| 3,185,354 | 5/1965 | Lipman | 222—380 X |
| 3,191,814 | 6/1965 | Corsette et al. | 222—321 X |
| 3,248,021 | 4/1966 | Corsette et al. | 222—321 |

ROBERT B. REEVES, *Primary Examiner.*